United States Patent [19]

Mullen, Jr. et al.

[11] 3,920,907

[45] Nov. 18, 1975

[54] PERIODIC SIGNAL DETECTOR

[75] Inventors: Walter W. Mullen, Jr., Lynn Haven; George L. Hooks, III, Panama City, both of Fla.

[73] Assignee: The United States of America as represented by the Secretary of the Navy, Washington, D.C.

[22] Filed: July 3, 1974

[21] Appl. No.: 485,667

[52] U.S. Cl. .............................................. 179/1 VC

[51] Int. Cl.$^2$ .......................................... H04M 3/40

[58] Field of Search .............179/1 SA, 1 VC, 1 MN, 179/100.1 VC, 179/1 H, 1 HF

[56] References Cited

UNITED STATES PATENTS

| | | | |
|---|---|---|---|
| 3,335,225 | 8/1967 | Campanella et al. | 179/1 SA |
| 3,767,860 | 10/1973 | Brown | 179/1 MN |

*Primary Examiner*—Douglas W. Olms
*Attorney, Agent, or Firm*—Richard S. Sciascia; Don D. Doty; Harvey A. David

[57] ABSTRACT

A periodic signal detector is disclosed which may be incorporated to an advantage in a voice actuated communication system. It comprises a series connected low pass filter, limiter, and bistable multivibrator, the outputs of the latter of which are respectively connected to the inputs of a pair of ramp generators. A differential comparator detects the difference in the output voltage from said pair of ramp generators and uses it to timely trigger a first monostable multivibrator. A shift register and AND gate extracts a desired program of successive binary signals from the output signal from said first monostable multivibrator. A second monostable multivibrator, triggered by one of the outputs of said bistable multivibrator, in turn, resets said ramp generators and timely shifts said shift register. The output of said AND gate is used to key a transmitter or some other utilization apparatus.

20 Claims, 4 Drawing Figures

PERIODIC SIGNAL DETECTOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention, in general, relates to signal detection and, in particular, is a system for detecting signals of predetermined frequency that have a certain periodicy from within a band of frequencies, and for rejecting those signals within said band of frequencies which are random in frequency and occurrence. In greater particularity, the subject invention is a periodic signal detector which is exceedingly accurate in detecting certain vowel sounds, such as those which occur in human speech, and triggers a communication transmitter in response thereto.

DESCRIPTION OF THE PRIOR ART

Heretofore, voice operated transmissions of communication systems have, for the most part, been dependent upon sensing a certain preset level of energy which is greater in amplitude than the spurious noise associated therewith. To implement such procedure, the communication circuit involved would be preset to be actuated whenever the human speech signals supplied thereto exceeded some predetermined treshold. Although perhaps satisfactory for some particular circumstances, such systems usually left a great deal to be desired during such adverse conditions where the amplitudes of the undesirable noise signals were equal to or greater than the intelligence portions of the speech signals, because the undesirable and untimely triggering of a transmitter was often times caused by such undesirable and spurious noise signals. Hence, such thresholding technique proved to be unsatisfactory in many communication situations, regardless of the ambient environmental medium within which such communication was being attempted.

When situations such as swimmers and divers attempting to talk to each other are involved, the noise encountered thereby is even more severe and more deleterious to threshold triggering, inasmuch as the signal-to-noise ratios pertinent thereto were adversely affected as well. It, therefore, obviously becomes very desirable to have clean, clear-cut, speech signals, if they are to be used as the enabling signals for underwater communication systems. However, in the past, the communication systems used for such purpose were, for the most part, somewhat unsatisfactory, too, inasmuch as only vowel sounds were utilized as the initiator or operative signals. Vowel sounds usually seem to have energy concentrated within certain frequency bands entitled formants. Hence, many voice operated diver communication systems of the prior art incorporate filter circuits that pass the energy of a certain vowel, the utterance of which would be effective to key a transmitter. This approach was somewhat successful when a particular microphone was used in a particular location within a suitably designated diver's face mask; however, when an improved gradient microphone was used in a location directly in front of a speaker's lips, the voice operated circuit was actuated — and, hence, the transmitter was triggered on — every time the speaker breathed, due to the fact that noise was generated by his breath flow across or on the microphone. To say the least, this was an untenable situation which effectively interferred and sometimes prevented good communication between underwater swimmers and divers.

Still another approach to voice operated circuits used heretofore in, say, vehicular communications, particularly in military communications, compares the outputs of two microphones, where one thereof is a noise sensing unit and the other thereof is a voice sensing unit. In such case, when speech sounds are present at the proper microphone, a switching circuit is energized, thereby enabling the transmitter. Such method and means are analogous to the presence of a virtual threshold which rises and falls with changes in noise level. Unfortunately, this approach is not applicable to situations where the noise ambient to the aforesaid two microphones is near field, such as is the situation inside a diver's face mask because in such cases, the noise is more or less overriding as far as the speech signals are concerned. As a result, little or no signal-to-noise ratio improvement is effected by such arrangement.

Of course, the most conventional means employed in the past to trigger the transmitters of communication systems — regardless of type — has been the pushbutton that is connected for effecting the energization or actuation thereof whenever it is pushed by a human being. Naturally, such arrangement is quite satisfactory whenever the hands of said human being are not needed at the time of speaking for some other purpose or activity. However, in the event that both hands of said human being are otherwise needed, the necessity of pushing said pushbutton therewith can present an awkward situation, indeed.

SUMMARY OF THE INVENTION

The present invention overcomes many of the disadvantages encountered in the devices of the prior art, inasmuch as it operates on the principle that the vowel sounds of human speech are generated by the opening and closing of the vocal cords in a periodic manner, which ostensively constitutes a unique set of operative parameters.

Of course, at the outset, it should perhaps be noteworthy that although the subject system is primarily intended for initiating the operation of the transmitter of underwater communications systems used by divers (so that they may talk to each other), it is not limited thereto. Thus, it may readily be seen that, with proper design changes incorporated therein, it may be operated by any predetermined input signal that is supplied thereto which is the equivalent of, similar to, or contains the aforesaid periodicy of said opening and closing vocal cords, regardless of source or ambient environmental medium. The design and selection thereof would obviously be determined by the type of signal being monitored and perhaps by other operational circumstances, as well. Of course, it would be well within the purview of the artisan having the benefit of the teachings presented herewith to make whatever design choices as are necessary to enable the instant invention to function properly during any given operational circumstances. Hence, although the preferred embodiment of the invention is herewith disclosed as being a voice operated cmmunication system used by underwater divers and swimmers while they are working or otherwise operating within water, sea water, or the like, it should not be considered as being limited thereto.

In general, moreover, the invention includes an improved periodic signal detector that may be used to an advantage in conjunction with various and sundry input and output apparatus. But because male voices usually contain, among a complexity of frequencies, a fundamental vocal cord frequency of 120 Hz plus or minus approximately one-half octave, the preferred embodiment of the subject invention is herein disclosed as being capable of detecting a periodic signal within such frequency range.

It is, therefore, an object of this invention to provide an improved periodic signal detector.

Another object of this invention is to provide an improved method and means for detecting and indicating the presence of a predetermined data signal having a given frequency periodicy from within a plurality of other signals, including random or other noise signals.

Still another object of this invention is to provide an improved periodic detector for noise immune voice operated transmit or keying circuit (VOX).

Another object of this invention is to provide an improved method and means for detecting the periodicy of vowel sounds in human speech.

A further object of this invention is to provide a method and means for triggering, actuating, and enabling a predetermined utilization apparatus in response to a predetermined signal.

Another object of this invention is to provide an improved method and means for distinguishing between periodic and random signals.

A further object of this invention is to provide a periodic signal detector which will be unresponsive to random noise signals, regardless of the power level thereof.

Still another object of this invention is to provide an improved voice operated communications system.

Another object of this invention is to provide an improved communication system which is enabled by the voice of a swimmer, dirver, or other being, rather than by the hands or other appendages thereof, thereby leaving said hands or other appendages free for doing other things, such as useful work or the like.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figures 1, 4:
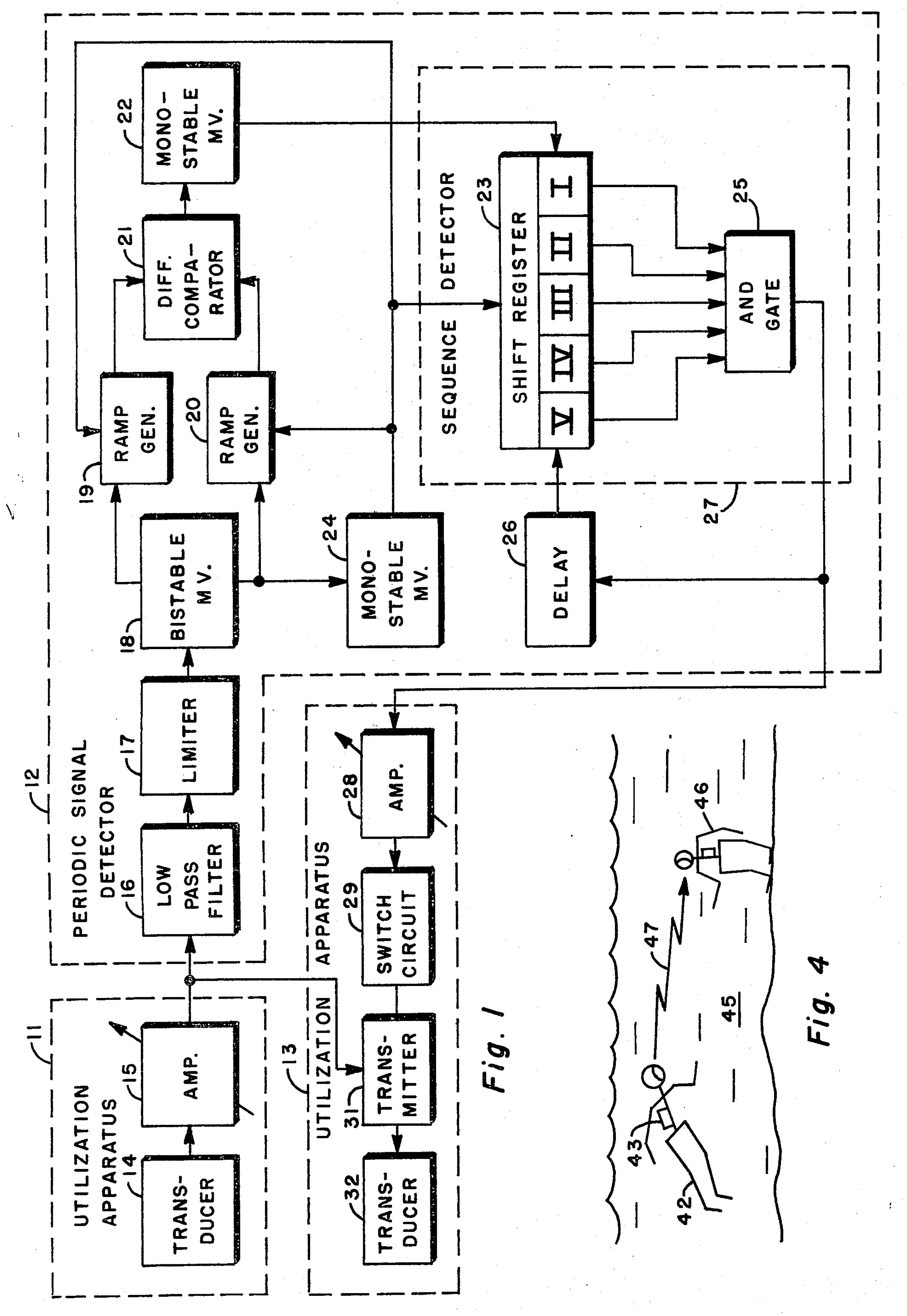
FIG. 1 is a block diagram of a system constituting a preferred embodiment of this invention.
FIG. 4 is a quasi-pictorial representation of a situation in which the unique system of FIG. 1 may be used to an advantage.

Referring now to FIG. 1, there is disclosed a generalized illustration of a utilization apparatus 11, the output of which is connected to the input of a relatively noise immune periodic signal detector 12 and to one of the inputs — in this particular case, the data or intelligence signal input — of another generalized utilization apparatus 13. The output of the aforesaid periodic signal detector 12 is connected to the trigger or enabling input of said another utilization apparatus 13 for reasons which will be discussed more fully subsequently.

Although generalized above, in this particular case, utilization apparatus 11 comprises a receiving transducer 14 of the type ordinarily defined as being a microphone which is responsive to human speech signals and which converts them to electrical signals that are proportional thereto. In this particular embodiment, receiving transducer 14 is preferably located in the face mask of a diver (not shown), as will be discussed again below. The output of transducer 14 is connected to an adjustable gain amplifier 15, the output which, of course, constitutes the output of utilization apparatus 11.

The output of amplifier 15 is connected to the input of a low pass filter 16, which is preferably designed so as to pass signal frequencies withinin the 0 to 200 Hz range, and which, in this particular instance, constitutes the input of the aforementioned periodic signal detector 12. The output of low pass filter 16 is connected to the input of a limiter 17, the output of which is connected to the input of a bistable flip-flop or multivibrator 18.

The opposite polarity outputs of bistable multivibrator 18 are connected to the inputs of a pair of linear ram generators 19 and 20, respectively, the outputs of which are respectively connected to the inputs of a differential comparator 21. The output of differential comparator 21 is connected to the input of a monostable multivibrator 22, and the output of monostable multivibrator 22 is connected to the data signal input of a shift register 23 of the type which, in this particular instance, constitutes a five stage shift register.

The output of the aforementioned bistable multivibrator 18 is also connected to the input of another monostable multivibrator 24, the output of which is connected to the reset inputs of ramp generators 19 and 20 and the shift or clock input of the aforesaid shift register 23.

Although shift register 23 is shown herein to have five stages, it may, if so desired, be designed to have less than five stages in order to provide a shorter response time. However, in such case, the noise immunity would likewise be reduced. On the other hand, a higher noise immunity can be provided by making shift register 23 have more than five stages. However, in such case, the response time thereof would be longer. Accordingly, it may readily be seen, that the design selection of the number of stages for shift register 23 would depend upon the operational circumstances in which the subject invention is being used, if optimization thereof is desired.

Accordingly, in this particular preferred embodiment of the invention, the five stages of shift register 23 have five outputs which are respectively connected to the five inputs of an AND gate 25. The output of AND gate 25 is connected through a delay line 26 to the reset input of shift register 23, and, of course, as may readily be observed, the output of AND gate 25, in fact, constitutes the output of the aforementioned periodic signal detector 12.

In the event it is desired to design periodic signal detector 12 to be applicable for a number of different operational situations, low pass filter 16, limiter 17, bistable multivibrator 18, ramp generators 19 and 20, monostable multivibrators 22 and 24, and shift register 23, may be made adjustable, so that the respective parameters thereof may be as versatile as warranted or required by either varying or stable operational conditions.

The output of the aforesaid AND gate 25 of periodic signal detector 12 is connected to the input of utilization apparatus 13 and, in this particular instance, to the input of an adjustable gain amplifier 28 incorporated therein. The output of adjustable gain amplifier 28 is connected to the input of switching circuit 29, the latter of which is of the type that switches a transmitter 31, to which it is connected, on and off, depending on whether or not an output signal occurs at the output of AND gate 25. Although switching circuit 29 is disclosed herein as being a circuit that is separate and distinct from transmitter 31, it may, indeed, be an integral part thereof, if so desired. Moreover, it should be understood that in the event some other component is substituted by the artisan for transmitter 31, switching circuit 29 should be one that is properly designed to be compatible therewith, so that it may be timely triggered on or off or otherwise actuated, as necessitated by operational circumstances.

The output of transmitter 31 is connected to the input of a transmitting electroacoustical transducer 32, which, of course, in this particular embodiment, is of the type that broadcasts acoustical energy throughout a subaqueous medium or other medium for diver communication purposes.

As may readily be seen, amplifier 28, switching circuit 29, transmitter 31, and transducer 32, in this particular instance, constitute the aforementioned utilization apparatus 13; however, for purposes of emphasis, it is again herewith indicated that any other suitable utilization apparatus requiring that an enabling signal be supplied thereto may be substituted therefor without violating the spirit and scope of this invention.

Since the preferred embodiment depicted in FIG. 1 is intended to be a voice actuated communication system of the type that can be used to an advantage by swimmers and divers, it becomes necessary for the complex speech to be broadcast by transmitting transducer 32, once it has been spoken into receiving electroacoustical transducer 14. Therefore, the output of amplifier 15 is electrically connected to the data or speech processing input of transmitter 31, so that the broadcast thereof will be effected simultaneously with the occurrence of the actuation supplied to amplifier 28 by AND gate 25 of periodic signal detector 12.

Obviously, if some other utilization apparatus is being substituted for that illustrated as utilization apparatus 13, the aforesaid electrical connection between the output of amplifier 15 and the speech input of transmitter 31 may or may not be necessary.

It would perhaps be worthy of note that all of the components shown in block form in the system of FIG. 1 are well known, conventional, and comercially available per se. Therefore, it should be understood that it is their new and unusual interconnections and interactions that constitute the subject invention and causes it to produce the unique results stated and implied above.

Figure 2:
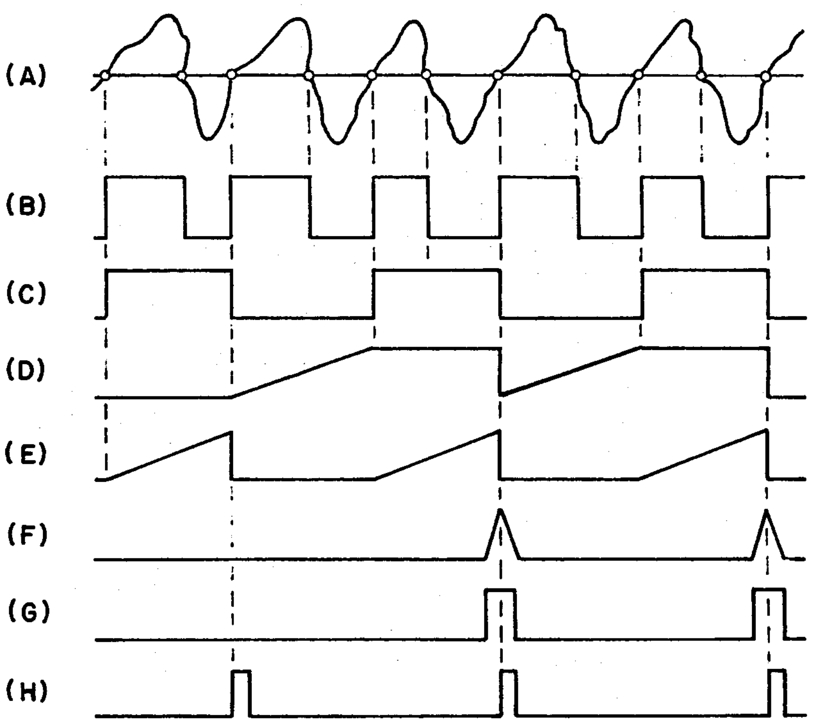
FIGS. 2 and 3 depict idealized graphical representations of the signal waveforms that emanate from the various and sundry components depicted in block form in the system of FIG. 1.
Figure 3:
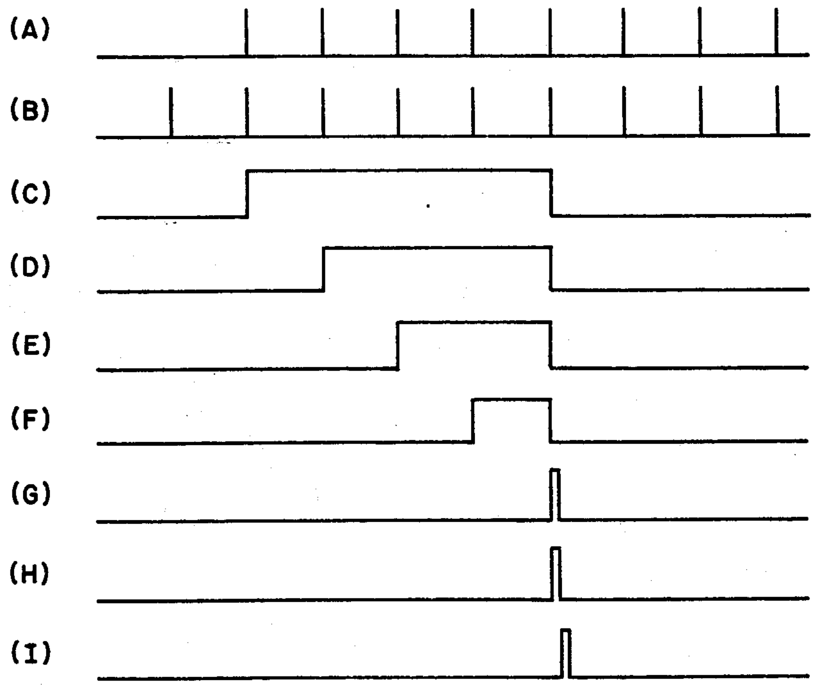

The various and sundry signals waveforms of FIGS. 2 and 3 are idealized representations of those occurring at the inputs and otputs of the various and sundry components of the system of FIG. 1, respectively. Hence, they will be discussed more fully during the discussion of the mode of operation of the invention presented below.

MODE OF OPERATION

Referring now to FIG. 4, a typical mode of operation of the invention is illustrated as including a first swimmer 42 who is carrying the subject invention 43 — with receiving transducer 14 within face mask 44 — while swimming within water 45 and communicating with a second swimmer 46 by means of speech signals 47, which were broadcast as a result of swimmer 42 talking into said receiving transducer 14. Of course, as previously indicated, transducer 14 is preferably located in the face mask of swimmer 42 and, thus, it and the associated transmission apparatus are enabled by the voice thereof.

As also previously suggested, the vowel sounds of the human speech are generated as a result of the opening and closing of the speaker's vocal cords in periodic manners, respectively, and male voices ordinarily have a fundamental vocal cord frequency of 120 Hz plus or minus one-half octave. Of course, female voices also have their own fundamental vocal cord frequencies for which the subject system may be programmed as designed, but for the purpose of keeping this disclosure as simple as possible, the aforesaid male frequencies will by used in this brief discussion of the operation of the invention.

Assuming the exemplary communication of FIG. 4, the electrical equivalent of the talker's speech signals are effectively supplied by transducer 14 to low pass filter 16 of periodic signal detector 12. Since low pass filter 16 has been designed to reject all frequencies above 200 Hz, said speech signals may acquire the appearance of the waveform shown in FIG. 2(A) at the output thereof. This filtered signal is then converted to a squarewave signal similar to that shown in FIG. 2(B) by limiter 17. The output of limiter 17 triggers bistable multivibrator 18 each time limiter 17 changes state in the same direction, to thereby cause a signal similar to that shown in FIG. 2(C) to be generated at the output thereof. One of linear ramp generators 19 or 20 is started each time bistable multivibrator 18 changes state. This is due to the fact that said ramp generators 19 and 20 are fed from opposite sides — that is, from the opposite polarities — of bistable multivibrator 18, thereby causing each one thereof to alternate with the other and effectively sweep every other state change of bistable multivibrator 18.

For instance, let is be assumed that bistable multivibrator 18 changes state in such manner that it causes ramp generator 19 to start sweeping as shown in the waveform of FIG. 2(D). Then, at the next change of state of bistable multivibrator 18, generator 19 stops sweeping and holds the voltage level it has reached (see FIG. 2(D) again), while generator 20 begins sweeping, so as to cause the signal waveform of FIG. 2(E) to be produced at the output thereof. The two sweep voltages — that is, the signals of FIG. 2(D) and FIG. 2(E) — are both fed to differential comparator 21. As long as the ramp voltages thereof are different, the output of differential comparator 21 is either high or low; but when said ramp voltages pass through equality, differential comparator 21 makes a transition from one voltage level to another, thereby causing the pulses shown in the waveform of FIG. 2(F) to be triggered thereby.

In this particular preferred embodiment, the circuit arrangement has been designed such that as the ramp sweep of ramp generator 20 reaches the level of the ramp sweep of ramp generator 19 from having been less, then the transition in the output signal (see FIG. 2(F) again) from differential comparator 21 is of the proper polarity to trigger monostable multivibrator 22.

Monostable multivibrator 24 should be so designed as to be triggered whenever bistable multivibrator 18 switches to the state which causes generator 19 to begin sweeping and generate its ramp voltage.

The output signals from monostable multivibrators 22 and 24 are respectively fed to the data and shift inputs of shift register 23. Although, said output signals, as they were discussed above, were depicted in an abridged manner with an expanded time frame in FIG. 2(G) and (H), respectively, they are shown again in FIG. 3(A) and (B) in a somewhat compressed time frame, relatively speaking, since the pulses thereof are, in fact, very considerable in number.

In this particular embodiment of the invention, let it be assumed that shift register 23 contains five stages, herewith defined as stages I, II, III,, IV, and V and that the combination of shift register 23 and AND gate 25 is such that said AND gate 25 produces an output signal when and only when each of the aforesaid five shift register stages contains a "1" therein. In such case, whenever the first pulse of the signals of FIG. 3(A) and FIG. 3(B) occur simultaneously, stage I is loaded with a 1. Then if each of the successive four pulses are also 1s, shift register 23 becomes loaded and the outputs from stages I through V produce signal waveforms which are similar to FIG. 3(C), FIG. 3(D), FIG. 3(E), FIG. 3(F), and FIG. 3(G), respectively. Then, since all of the five output signals from shift register 23 are 1s, they actuate or open AND gate 25, thereby causing a signal pulse similar to that illustrated in FIG. 3(H) to be produced at the output thereof. Hence, in this particular case, a pulse occurs at the output of AND gate 25 every time five successive 1 signals are detected by shift register 23. Accordingly, it could be said that the combination of shift register 23 and AND gate is, functionally speaking, a programmed binary signal sequence detector 27, with the program presently incorporated therein and discussed above being five successive 1 signals.

It would appear to be noteworthy at this time, however, that shift register 23 may have any number of stages that are programmed with any binary signal program that would optimize it for any operational circumstances. Of course, in such instance, one or more logic inverters (not shown in this preferred embodiment) would have to be inserted between the outputs of the stages of shift register 23 and the inputs of AND gate 25 for those stages that are to be operative when a "0" is loaded therein. Obviously, it would be well within the purview of one skilled in the art having the benefit of teachings presented herewith to incorporate whatever number of the aforesaid logic inverters as would be needed to effect any given operative program in shift register 23.

Once shift register 23 has been loaded with those binary signals that meet the requirements of its preset program — in this case, five successive 1s — and AND gate 25 produces its output pulse of FIG. 3(H), said pulse is used to perform two separate functions, viz.: (1) to trigger utilization apparatus 13, and thereby enable it in such manner as will be explained in greater detail below; and (2) to trigger delay 26 which, then, in turn, after a preset (but very short) delay period, produces a pulse at the output thereof that is similar to that shown in FIG. 3(I) which is supplied to shift register 23 for the purpose of effecting the clearing thereof of whatever bits were loaded therein prior to the generation of the pulse of FIG. 3(H) by AND gate 25. Of course, the clearing of shift register 23 makes it ready to detect and select another similar program of binary signals from the output signal of monostable multivibrator 22.

As previously suggested, periodic signal detector 12 has applications too numerous to discuss here; therefore, it should be appreciated that utilization apparatus 13 may be any of many different types of devices. Nevertheless, in this preferred embodiment, apparatus 13 contains an adjustable gain amplifier 28, a switching circuit 29, a transmitter 31, and a transmitting transducer 32 connected in series. Thus, the pulse of FIG. 3(H) after proper amplification, is supplied to transmitter 31 to enable it or, in other words, turn it on. Once enabled, transmitter 31 receives the speech output signals from amplifier 15 and processes them as necessary to cause transducer 32 to broadcast them throughout the enviromental medium within which it is deployed.

For the purpose of emphasis, let it be assumed that the operational condition of FIG. 4 exists, that swimmer 42 is talking to swimmer 46, and that in this particular instance, swimmer 42 is a male swimmer. Then the input signal to transducer 14 and, hence, to low pass filter 16 of periodic detector 12 would be, to some extend, periodic because it contains some male voice vowels. As a result, the output of bistable multivibrator 18 is also periodic, with the duration of each half cycle thereof equal to one period of the incoming signal. When ramp generator 19 sweeps, it will attain and hold a voltage level that is directly proportional to the interval of time it sweeps (see FIG. 2(D)), and the same thing occurs for ramp generator 20 (see FIG. 2(E)). Since the sweeping intervals of time are equal — due to the periodicy of the input signal — the voltage levels become equal at the end of one cycle of bistable multivibrator 18. Therefore, the transition of differential comparator 21 takes place (see FIG. 2(F)), thereby triggering monostable multivibrator 22, so as to produce pulses similar to those of FIG. 2(G). Of course, when the pulses from monostable multivibrator 22 occur at the same time as the pulses from monostable multivibrator 24, (see FIG. 2(H)), the loading of the aforementioned shift register 23 with binary 1s is effected.

The foregoing cycle is repeated for as long as the incoming signal to periodic signal detector 12 remains periodic; however, a different situation exists if it is not periodic, as will now be seen.

In the event the incoming signal to periodic detector 12 is not periodic — as, for example, in the case where the diver is making some noise by breathing, rather than by talking — then ramp generators 19 and 20 may or may not attain equal levels, depending on the duration of sweep times. If generator 20 sweeps less time than generator 19, it will not attain the voltage level being held by generator 19 and the output of comparator 21 will not make a transition. If generator 20 sweeps more time than generator 19, it will reach the level held by generator 19 and cause a transition of comparator 21, thereby triggering monostable multivibrator 22 too early to coincide with the triggering of monostable multivibrator 24. In either case, a 0 will be loaded into shift register 23. Occasionally, the sweep intervals — due to a non-periodic signal — may be sufficiently equal to result in a 1 being loaded into shift register 23, but the probability of five such chance occurrences in a row is extremely small. Therefore, the subjet invention is highly immune to producing a false output due to signals which are not properly periodic.

The output signals from effectively series connected shift register 23 and AND gate 25 constituting program sequence detector 27 may be used to an advantage to key any utilization apparatus 13 or effectively key communication transmitter 31 whenever the speech input signal contains predetermined periodic signals; but when the input signal is not periodic, to the extent that it occurs in accordance with the program of shift register 23, then no output signal occurs at AND gate 25. Of course, such is the case when random signals are applied to the input of the subject periodic signal detector.

The aforesaid monostable multivibrators 22 and 24 should preferably be designed in such manner that the duration of the output signals therefrom are approximately an order of magnitude less than expected average period of the input signal of periodic signal detector 12, so as to produce rather narrow limits within which the period of any given cycle of input signal must equal the period of the following cycle thereof. The output duration of monostable multivibrator 22 should be made slightly longer than that of monostable multivibrator 24, so that the triggering of the former will occur prior to the resetting of the sweeps of the aforesaid ramp generators 19 and 20, but still remain in existence until the end of the output signal from monostable multivibrator 24. Within limits, if so desired, the period of the input signal to detector 12 may be variable, since the ramp voltage levels attained by ramp generators 19 and 20 are greater or less, respectively, as the input signal period is longer or shorter, as long as they are still equal for the same intervals of time.

In addition, if so desired, the subject invention may be so designed as to readily accommodate a two-to-one range in periods (one octave in frequency). In such case, ramp generators 19 and 20 are adjusted to attain an output voltage level of about one-half the maximum possible voltage level when the incoming signal is of the average expected period. So doing allows the sweep of ramp generators 19 and 20 to be greater or less in voltage level than the average.

An alternate method of and means for implementation of the above described embodiment of the invention would be to replace the aforementioned ramp generators with digital counters which would count the cycles of a reference clock. In such case, the count duration of one period would be compared to the count duration of the following or suceeding periods, and an output signal would be produced at the output of comparator 21 if the counts agreed in number within some preset limit.

From the foregoing, it may readily be seen that diver communication is more expeditiously accomplished because the transmitter employed therefore is keyed and, thus, enabled to an operational condition by the periodicity of the vowel sounds in the diver's voice while he is speaking, say, to another diver (as disclosed, for example, in FIG. 4), inasmuch as such voice operated circuit (VOX) allows the diver's hands to remain free for other than transmitter keying activities. Moreover, the subject periodic signal detector incorporated in such a diver communication system, for the most part, precludes actuation or keying of said transmitter, regardless of ambient noise level, as long as it is random or non-periodic, thereby effecting an exceedingly efficient and improved operation therefor.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifiecations and embodiments are intended to be included within the scope of the appended claims.

What is claimed is:

1. A periodic signal detector, comprising in combination:

means for receiving a first signal of complex frequencies and for passing those frequencies thereof that are below a predetermined frequency as a second signal;

means connected to the output of said receiving and passing means for converting said second signal into a third signal having a substantially squarewave configuration that is corresponding thereto;

means having an input and a pair of outputs, with the input thereof connected to the output of said converting means for alternately producing a pair of oppositely polarized fourth and fifth signals at the outputs thereof in response to a predetermined directional transition of the squarewave configurations of said third signal, respectively;

means connected to one of the outputs of said oppositely polarized signal producing means for generating a substantially linearly increasing sixth signal in response to said fourth signal;

means connected to the other of the outputs of said polarized signals producing means for generating a substantially linearly increasing seventh signal in response to said fifth signal;

means connected to the outputs of said sixth and seventh signal producing means for comparing the magnitudes of said sixth and seventh signals and for producing an eighth signal that is proportional to the difference therebetween;

means connected to the outputs of said sixth and seventh signals comparing means for producing a ninth signal of predetermined duration in response and proportional to said eighth signal;

means connected to the other of the outputs of the aforesaid oppositely polarized signals producing means for producing a tenth signal of predetermined duration in response and proportional to said fifth signal;

means connected to the outputs of said ninth and tenth signals producing means for producing an eleventh signal whenever a predetermined program of successive binary signals occurs within said ninth signal; and means connected to the output of said tenth signal producing means for timely resetting the aforesaid sixth and seventh signals producing means in response to said tenth signal.

2. The device of claim 1, wherein said means for receiving a first signal of complex frequencies and for passing those frequencies thereof that are below a predetermined frequency as a second signal comprises a low pass filter.

3. The device of claim 1, wherein said means connected to the output of said receiving and passing means for converting said second signal into a third signal having a substantially squarewave configuration that is proportional thereto comprises a limiter.

4. The device of claim 1, wherein said means having an input and a pair of outputs, with the input thereof connected to the output of said converting means for alternately producing a pair of oppositely polarized fourth and fifth signals at the outputs thereof in response to the squarewave configurations of said third signal, respectively, comprises a bistable multivibrator.

5. The device of claim 1, wherein said means connected to one of the outputs of said oppositely polarized signals producing means for generating a predetermined sixth signal in response to said fourth signal comprises a ramp generator.

6. The device of claim 1, wherein said means connected to the other of said outputs of said polarized signals producing means for generating a substantially linearly increasing seventh signal in response to said fifth signal comprises a ramp generator.

7. The device of claim 1, wherein said means connected to the outputs of said sixth and seventh signals producing means for comparing the magnitudes of said sixth and seventh signals and for producing an eighth signal that is proportional to the difference therebetween comprises a differential comparator.

8. The device of claim 1, wherein said means connected to the outputs of said sixth and seventh signals comparing means for producing a ninth signal of predetermined duration in response to said eighth signal comprises a monostable multivibrator.

9. The device of claim 1, wherein said means connected to the other of the outputs of the aforesaid oppositely polarized signals producing means for producing a tenth signal of predetermined duration in response to said fifth signal comprises a monostable multivibrator.

10. The device of claim 1 wherein said means connected to the output of said ninth and tenth signal producing means for producing an eleventh signal whenever a predetermined program of successive binary signals occurs within said ninth signal comprises:

a shift register having a data input, a clock shift input, a reset input, and a plurality of outputs, with the data input thereof connected to the output of said ninth signal producing means, and with the clock shift input thereof connected to the output of said tenth signal producing means.

11. The device of claim 1, wherein said means connected to the output of said tenth signal producing means for timely resetting the aforesaid sixth and seventh signals producing means in response to said tenth signal comprises electrical conductors.

12. The invention of claim 1, further characterized by a utilization apparatus connected to the input of said first signal receiving means for supplying said first signal thereto.

13. The invention of claim 1, further characterized by:

a receiving electroacoustical transducer adapted for receiving acoustical energy from within a predetermined environmental medium and producing an electrical signal proportional thereto at the output thereof; and an adjustable gain amplifier connected between the output of said electroacoustical transducer and the input of said first signal receiving means.

14. The invention of claim 1, further characterized by a utilization apparatus effectively connected to the output of said eleventh signal producing means.

15. The invention of claim 1, further characterized by:

a transmitter effectively connected to the output of said eleventh signal producing means; and a transmitting electroacoustical transducer connected to the output of said transmitter.

16. The invention of claim 1, further characterized by means connected to the output of said eleventh signal producing means for broadcasting a predetermined signal throughout a predetermined environmental medium.

17. The device of claim 1, further characterized by:

a switching circuit effectively connected to the output of said eleventh signal producing means;

a transmitter having a data signal input, a keying input, and an output, with the data signal input thereof connected to the input of the aforesaid means for receiving a first signal of complex frequencies and for passing those frequenceis thereof that are below a predetrmined frequency as a second signal, and with the keying input thereof connected to the output of said switching circuit; and a transmitting transducer connected to the output of said transmitter.

18. A periodic signal detector, comprising in combination:

a low pass filter adapted for receiving the signal containing the periodicy to be detected;

a limiter connected to the output of said low pass filter;

a bistable multivibrator having an input and a pair of outputs, with the input thereof connected to the output of said limiter in such manner as to be responsive to a predetermined transition of the limited signal therefrom;

a first ramp generator connected to one of the outputs of said bistable multivibrator;

a second ramp generator connected to the other of the outputs of said bistable multivibrator;

a differential comparator having a pair of inputs and an output, with the inputs thereof respectively connected to the outputs of said first and second ramp generators;

a first monostable multivibrator connected to the output of said differential comparator;

a second monostable multivibrator connected to one of the outputs of the aforesaid bistable multivibrator;

means connected between the output of said second monostable multivibrator and the inputs of said first and second ramp generators for effecting the timely resetting thereof;

a multi-stage shift register having a data input, a clock shift input, a reset input, and a plurality of outputs, the number of which is equal to the number of stages thereof, with the data inputs thereof connected to the outputs of said first monostable multivibrator, and with the clock shift input thereof connected to the output of said second monostable multivibrator; and an AND gate having a plurality of inputs and an output, with the plurality of inputs thereof respectively connected to the plurality of outputs of the aforesaid multi-stage shift register.

19. The invention of claim 18, further characterized by a delay line connected between the output of said AND gate and the reset input of the aforesaid multi-stage shift register.

20. The invention of claim 19, characterized by:

a receiving transducer, with the output thereof effectively connected to the input of the aforesaid low pass filter;

a switching circuit effectively connected to the output of said AND gate;

a transmitter having a data signal input, a keying input, and an output, with the data signal input thereof effectively connected to the output of said receiving transducer, and with the keying input thereof connected to the output of said switching circuit; and a transmitting transducer connected to the output of said transmitter.

* * * * *